United States Patent [19]

Watanabe et al.

[11] Patent Number: 6,072,584
[45] Date of Patent: Jun. 6, 2000

[54] CHARACTER INFORMATION PROCESSOR

[75] Inventors: Kenji Watanabe; Tomoyuki Shimmura; Takanobu Kameda; Chieko Aida, all of Tokyo; Hiroyasu Kurashina; Takeshi Hosokawa, both of Suwa, all of Japan

[73] Assignees: King Jim Co., Ltd.; Seiko Epson Corporation, both of Japan

[21] Appl. No.: 08/988,958

[22] Filed: Dec. 11, 1997

[30] Foreign Application Priority Data

Dec. 17, 1996 [JP] Japan .................................. 8-336997

[51] Int. Cl.⁷ .................................................. G06K 15/00
[52] U.S. Cl. .......................................... 358/1.11; 358/1.16
[58] Field of Search ................................ 707/1, 100–104, 707/200, 205, 500, 505–508, 523; 235/375; 395/101, 110, 117, 112, 115; 400/61, 76; 347/11, 60; 382/228, 309; 358/1.1, 1.11, 1.13, 1.16, 1.18

[56] References Cited

U.S. PATENT DOCUMENTS

| | | | |
|---|---|---|---|
| 5,455,872 | 10/1995 | Bradley | 382/228 |
| 5,609,424 | 3/1997 | Sakuragi et al. | 400/61 |
| 5,806,057 | 9/1998 | Gormley | 707/1 |
| 5,920,684 | 7/1999 | Hastings et al. | 395/112 |

FOREIGN PATENT DOCUMENTS

| | | |
|---|---|---|
| 0449322A | 10/1991 | European Pat. Off. . |
| 56-72988 | 6/1981 | Japan . |
| 62-107333 | 5/1987 | Japan . |
| 62-210528 | 9/1987 | Japan . |
| 334059 | 2/1991 | Japan . |
| 5159440 | 6/1993 | Japan . |
| 844721 | 2/1996 | Japan . |
| 8315024 | 11/1996 | Japan . |

OTHER PUBLICATIONS

Patent Abstracts of Japan, vol. 097, No. 002, Oct. 22, 1996.
Patent Abstracts of Japan, vol. 096, No. 011, Jul. 9, 1996.
Patent Abstracts of Japan, vol. 095, No. 008, May 2, 1995.

*Primary Examiner*—Arthur G. Evans
*Attorney, Agent, or Firm*—Lorusso & Loud

[57] ABSTRACT

The present invention relates to a character information processor in which limitation is imposed on an allowable number of a character string to be printed. The character information processor includes: storage means for storing an address file and a non-address character-string file in the same storage area thereof; an address file management table containing a management number, a registration flag representing whether or not an address file is registered in connection with the management number, address information representing a storage area of the storage means in which the address file associated with the management number is stored, and a proximate flag representing whether or not the address file associated with the management number is edited at the time immediately before the current time; and address file edit managing means for managing and editing the address file and the non-address character-string file which are stored in the same storage area of the storage means while distinguishing them from each other using the address file management table.

9 Claims, 10 Drawing Sheets

| ADDRESS FILE MANAGEMENT NUMBER | REGISTRATION FLAG | HEAD ADDRESS | DATA LENGTH | PROXIMATE FLAG 23c |
|---|---|---|---|---|
| 00 ¦ 99 | | | | |
| ⓪⓪ ¦ ⑨⑨ | | | | |

ATTN : Mr.Jones White
Room No. 803, 8th Floor, ABC Building,
312 Park Avenue, New York, N.Y. 10171

FIG.11B

ATTN : Mr.Jones White

Room No. 803, 8th Floor, ABC Building,

312 Park Avenue, New York, N.Y. 10171

CHARACTER INFORMATION PROCESSOR

BACKGROUND OF THE INVENTION

1. Field of the Invention

The present invention relates to a character information processor. The present invention can be applied to, for example, a tape printing apparatus which is adapted to print an input character string having one or more lines on a tape, or a stamp producing apparatus for producing a stamp whose stamp face has an uneven surface corresponding to an input character string having one or more lines.

2. Description of the Related Art

A tape printing apparatus, which is one of character printing apparatuses, is designed to facilitate preparation of a label originated by the user which is to be attached on a spine cover of a file or the like.

A conventional tape printing apparatus has a key which is provided on an operation panel and adapted to input characters so that a desired character string can be previously inputted by operating the key.

Also, the conventional tape printing apparatus has a tape feeding mechanism by which a tape can be fed and discharged through a tape discharging outlet.

Further, the conventional tape printing apparatus has a printing mechanism, including a thermal head, and a tape cutting mechanism provided in this order on the path for allowing the tape to be fed.

In the tape printing apparatus, when a print instruction key is operated, control means controls the tape feeding mechanism to feed the tape at a predetermined speed, and controls the tape printing mechanism to print the previously inputted character string on the tape thus fed.

Also, when printing of the character string is completed, the control means further controls the tape feeding mechanism to vacantly feed the tape (i.e., to feed the tape without performing printing on the tape) until a portion of the tape on which printing is completed is entirely positioned outside the tape printing apparatus, then causes the feeding of the tape to be stopped.

After the feeding of the tape is stopped, the tape portion on which the character string is printed is cut off by the tape cutting mechanism which is driven by the user or driven automatically.

Thus, a label originated by the user having thereon a desired character string can be obtained.

Meanwhile, labels prepared with the tape printing apparatus are used in various ways, and it is often used as an address label used for a letter or a post card. An address (destination) printed on the address label usually contains predetermined items, such as a zip code (hereinafter, a zip code includes a post code), an address, a company name and a person's name. Accordingly, input of such an address is usually performed in accordance with a so-called form input method in which character strings of the items are inputted item by item and the character string thus inputted are arranged by the apparatus itself. In some apparatuses, the address data inputted in accordance with the form input method is managed as a file as in the case of ordinary input data. In such apparatuses, the address data inputted in accordance with the form input method is converted into an ordinary input data and registered as a file.

However, in such apparatuses, files each containing address data (hereinafter, each of the files containing address data will be often referred to as "address file") and files each containing ordinary input data (hereinafter, each of the files containing ordinary input data will be often referred to as "non-address character-string file") are mixed. Therefore, if the user intends to edit or print an optional address file, he must perform complicated operations of extracting a desired file out of the mixed files. Further, when the user desires to modify the address data which have been converted into ordinary data, he cannot modify the address data on the form. Under the circumstances, unless the user takes the utmost care, he is in the danger of unintentionally modifying or changing the character strings of the unintended items or destroying the arrangement of the character strings.

In view of the above circumstances, there has been proposed a method in which address files and non-address character-string files are stored separately in different storage areas each having a fixed memory amount. However, according to this method, if the amount of either the address files or non-address character-string files exceeds the fixed amount thereof, files cannot be stored in their storage area even though there are empty spaces in the entire memory itself.

SUMMARY OF THE INVENTION

The present invention is accomplished in view of the above-mentioned problems.

It is an object of the present invention to provide a character information processor in which usability of the apparatus, particularly in functions related to an address, such as an address inputting function and an address printing function, are greatly enhanced.

To achieve the above object, the present invention provides a character information processor in which limitation is imposed on an allowable number of characters in a character string to be printed, the character information processor including: storage means for storing an address file and a non-address character-string file in the same storage area thereof; an address file management table containing a management number, a registration flag representing whether or not an address file is registered in connection with the management number, address information representing a storage area of the storage means in which the address file associated with the management number is stored, and a proximate flag representing whether or not the address file associated with the management number is edited at the time immediately before the current time; and address file edit managing means for managing and editing the address file and the non-address character-string file which are stored in the same storage area of the storage means while distinguishing them from each other using the address file management table.

In the character information processor according to the present invention, storage means stores an address file and a non-address character-string file in the same storage area thereof; an address file management table contains a management number, a registration flag representing whether or not an address file is registered in connection with the management number, address information representing a storage area of the storage means in which the address file associated with the management number is stored, and a proximate flag representing whether or not the address file associated with the management number is edited at the time immediately before the current time; and address file edit managing means manages and edits the address file and the non-address character-string file which are stored in the same storage area of the storage means while distinguishing them from each other using the address file management table.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIGS. 10A and 10B are explanatory views showing printed results of the address file in the Japanese style according to the embodiment; and FIGS. 11A and 11B are explanatory views showing printed results of the address file in the English style according to the embodiment.

DETAILED DESCRIPTION OF THE INVENTION

Hereinafter, a tape printing apparatus as an embodiment of the character information processor according to the present invention will be described with reference to the attached drawings.

(A) Overall Constitution of Electrical Members in the Embodiment

First, the overall constitution of electrical members in a tape printing apparatus as an embodiment of the character information processor according to the present invention will be described with reference to FIG. 2, which is a function block diagram showing the function of each element.

Figure 2:
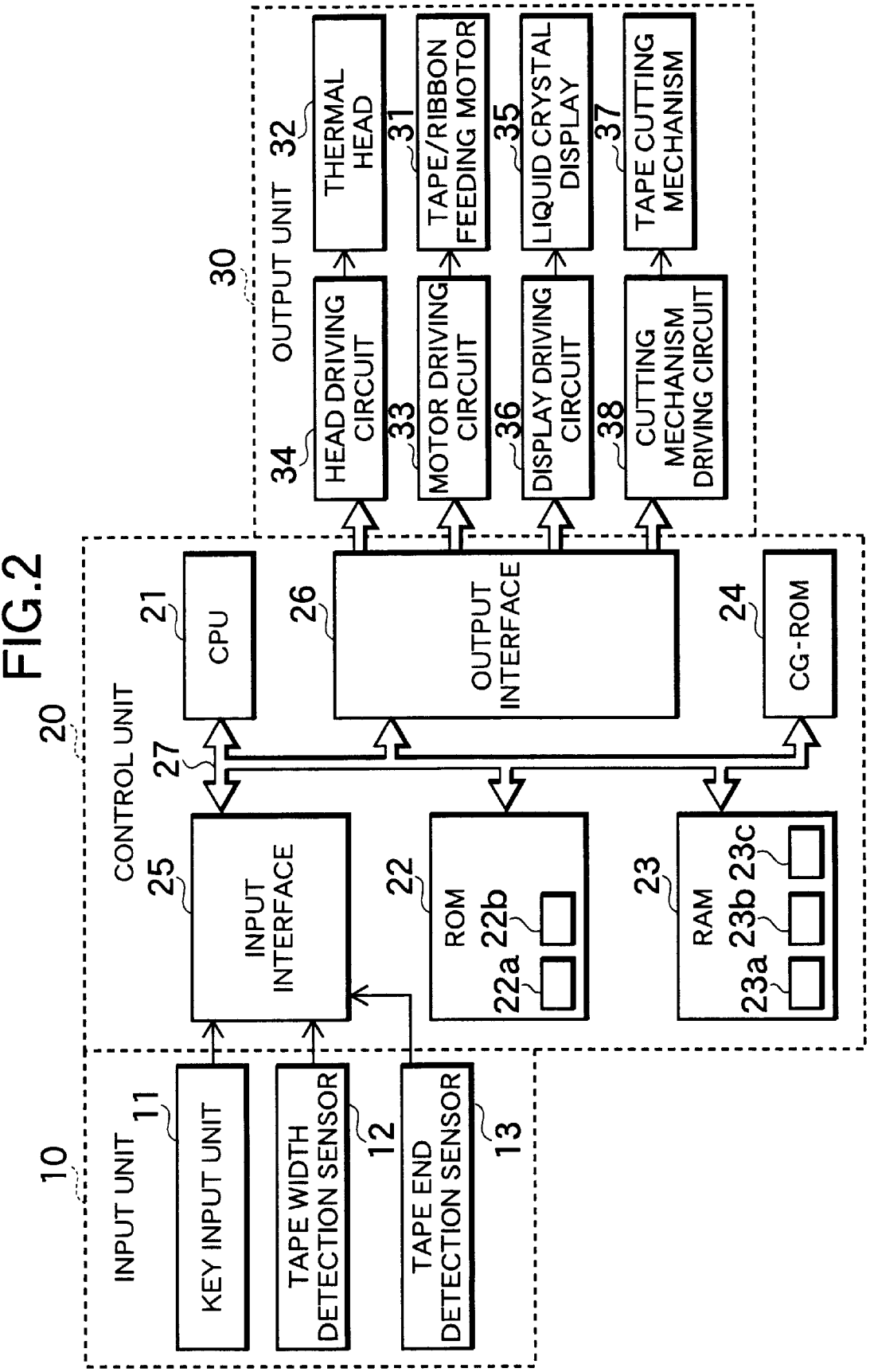
FIG. 2 is a function block diagram showing overall configuration according the embodiment.

As shown in FIG. 2, similarly to the other character printing apparatuses, the tape printing apparatus of this embodiment roughly includes an input unit 10, a control unit 20, and an output unit 30. The control unit 20 is adapted to execute processing in accordance with information supplied from the input unit 10, a processing stage at that time, and so on, and the result of the processing is outputted from the output unit 30 by way of display or print.

The input unit 10, while not detailed, includes a key input unit 11 having a depression key, a dial key and the like, a tape width detection sensor 12 and a tape end detection sensor 13. The key input unit 11 is adapted to generate character code data and various types of control data to be supplied to the control unit 20. The tape width detection sensor 12 is adapted to detect the width of the loaded tape and to supply tape width information to the control unit 20. In actual, detecting the tape width by the sensor 12 is conducted by reading a physical identification element (e.g., a hole) provided on a tape cartridge (which accommodates the tape and an ink ribbon) and representing the width of the tape accommodated in the tape cartridge. The tape end detection sensor 13 is adapted to detect ending of the tape (i.e., to detect that the tape is used up) and to supply tape end information to the control unit 20. Ending of the tape is detected, for example, by detecting increased tension of the tape caused by the state that the tape cannot be further pulled out, or alternatively by detecting an identification element provided at the end of the tape.

The output unit 30 includes members serving as a print mechanism and members serving as a display mechanism. The output unit 30 includes a tape/ribbon feeding motor 31 and a thermal head 32, both serving as the print mechanism. The tape/ribbon feeding motor 31 is constituted by, for example, a stepping motor and adapted to feed a tape and a ink ribbon loaded in the tape printing apparatus (both not shown) to a predetermined printing position or to the outside of the tape printing apparatus. The thermal head 32 is, for example, fixed and adapted to perform printing on the running tape by the thermal transferring method. The tape/ribbon feeding motor 31 is driven by a motor driving circuit 33, and the thermal head 32 is driven by the head driving circuit 34, both driven under the control of the control unit 20.

The output unit 30 also includes a tape cutting mechanism 37. The tape cutting mechanism 37 is adapted to cut the tape and is driven by a tape cutting mechanism driving circuit 38 under the control of the control unit 20. Cutting of the tape may be conducted by the force applied by the user.

In the case of the tape printing apparatus according to this embodiment, the output unit 30 includes a liquid crystal display 35 as the display mechanism. The liquid crystal display 35 is driven by a display driving circuit 36 under the control of the control unit 20 and adapted to directly display an input character string, various attribute information, and so on. On the display 35, there are displayed a plurality of indicators which are adapted to be lighted, flashing or lighted off to indicate states of the attributes (such as character sizes and input lines) designated by the characters printed at the portions lying on the apparatus body and surrounding the display 35. It should be noted that, as the liquid crystal display 35, a liquid crystal display which can display, for example, four lines by six characters is employed.

The control unit 20 is constituted by, for example, a microcomputer. The control unit 20 includes a CPU 21, a ROM 22, a RAM 23, a character generator ROM (CG-ROM) 24, an input interface 25 and an output interface 26 that are connected via a system bus 27.

The ROM 22 stores various types of processing programs, and fixed data such as dictionary data for kana-kanji conversion. The RAM 23 is used as a working memory and adapted to store fixed data associated with the user input. The RAM 23 is backed up even while the electric power is turned off. Further, in some cases the RAM 23 may include an add-on RAM as well as the memory provided in the apparatus.

The processing programs and the fixed data stored in the ROM 22, and the fixed data stored in the RAM 23 will be detailed later. The ROM 22 stores a processing program 22a for performing processings related to an address file, and a zip code-administrative district name conversion table 22b which will be described later. In the RAM 23, a print buffer 23a, a display buffer 23b and an address file management table 23c are appropriately formed. In the RAM 23, address files are registered.

The CG-ROM 24 is adapted to store font information of letters provided in the tape printing apparatus, and to output, when code data for specifying a letter are supplied, font information corresponding thereto. The font information stored in the CG-ROM 24 may be either of outline font and bi tmap font. Alternatively, the CG-ROM 24 may store font information for display purposes and font information for print purposes, the former and latter font information being different from each other.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, by appropriately using fixed data stored in the ROM 22 or RAM 23. Also, the CPU 21 is adapted to cause the liquid crystal display 35 to display the state or result of the processing and so on, or to cause the state or result of the processing to be printed on a tape (not shown).

(B) Processing Related to Address File

The tape printing apparatus according to an embodiment of the character information processor according to the present invention is characterized in that address data can be registered and managed as a file which is different from a file of a non-address character-string.

Figure 1:
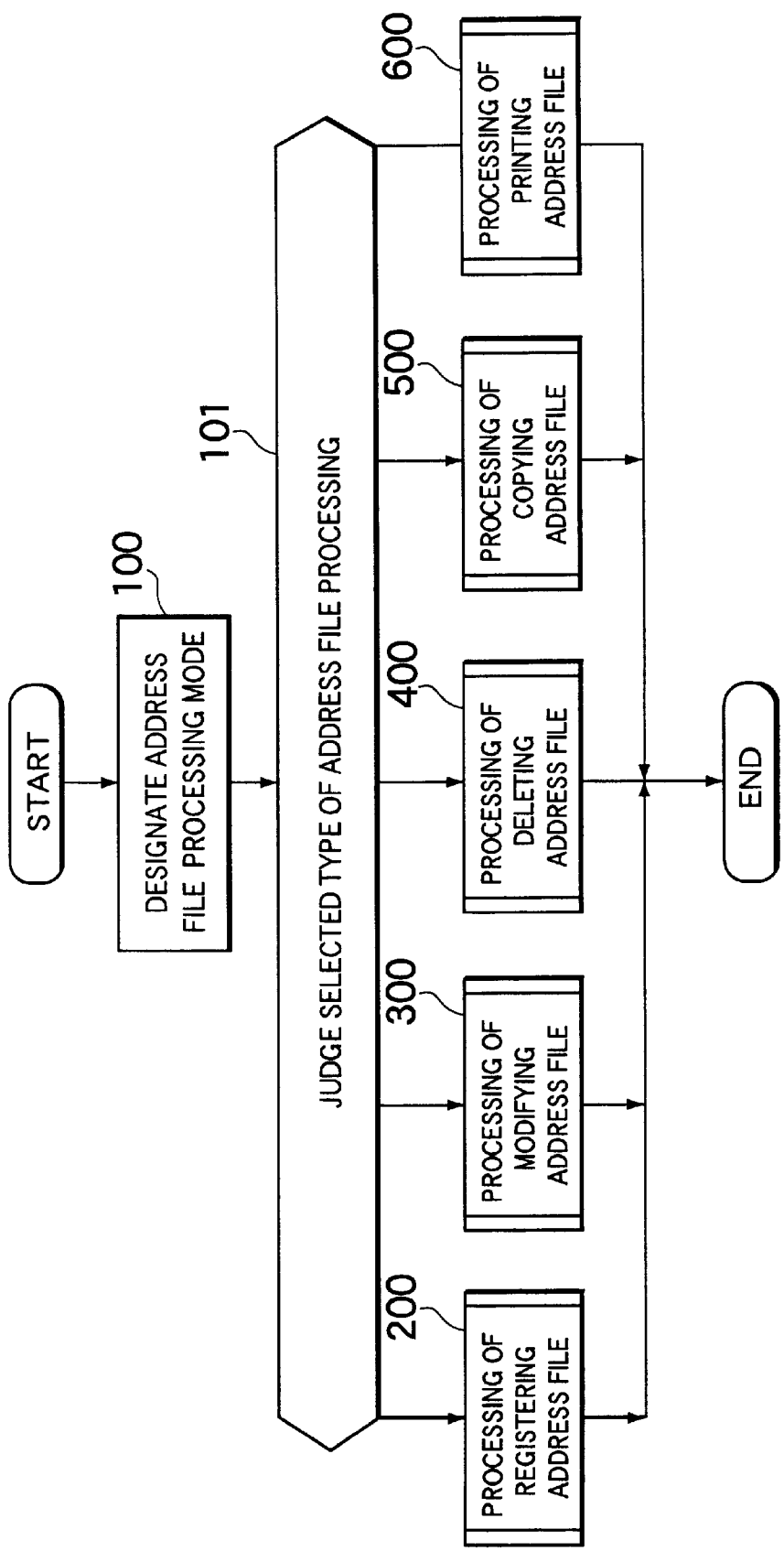
FIG. 1 is a flowchart showing overall processing associated with an address file according to the embodiment.

FIG. 1 is a flowchart showing the operations of the processing program 22*a* for performing processings related to the address file (hereinafter, often referred to as "address file processing"). When an address file processing mode is designated by operating an address key provided in the key input unit 11 or by selecting the address file processing mode from a menu, the CPU 21 starts the operations shown in FIG. 1.

Also, the CPU 21 allows the user to select a type of address file processing, for example, by selecting the type from the menu (step 100), and judges the type thus selected (step 101).

Figure 3:
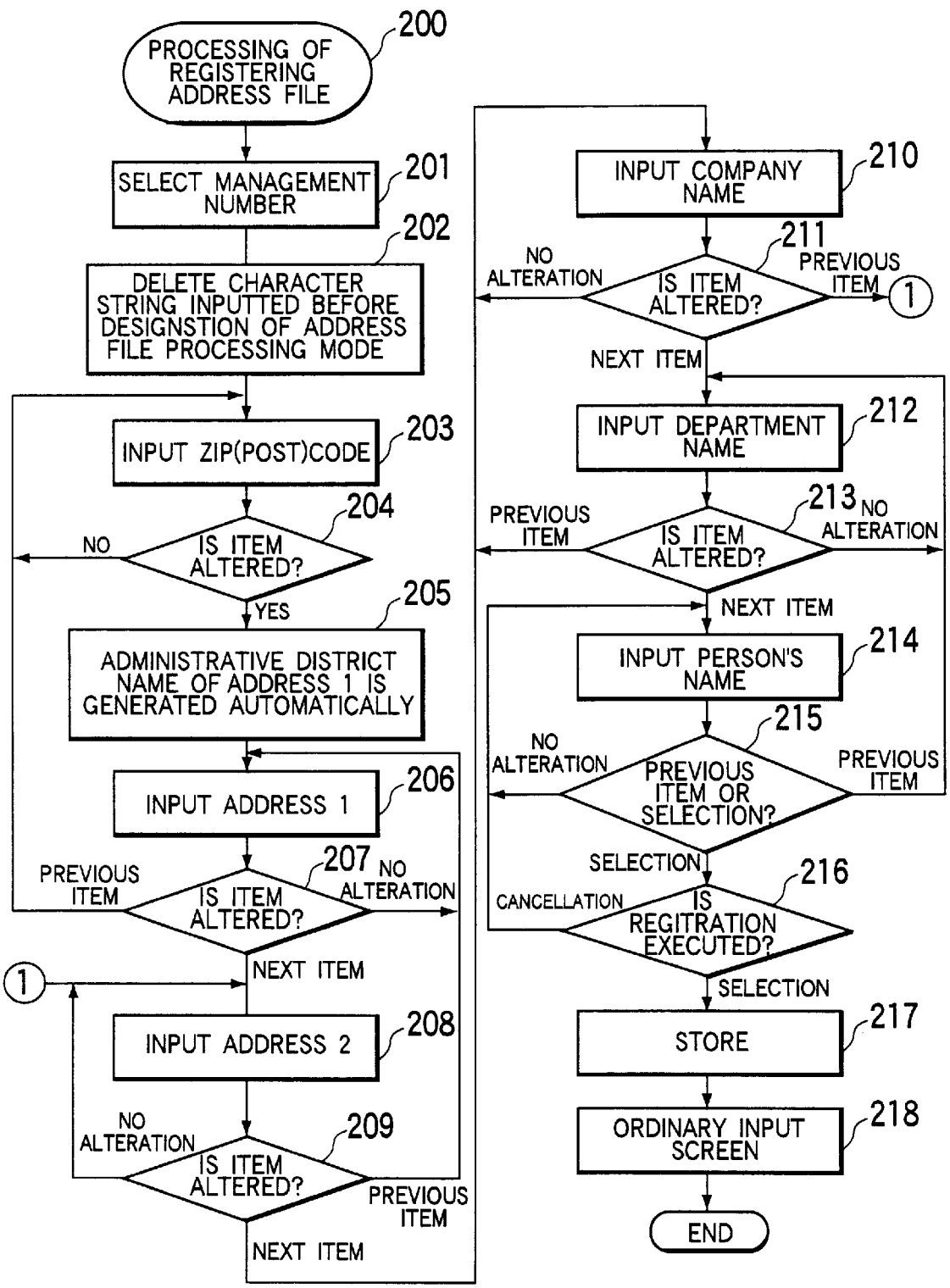
FIG. 3 is a flowchart showing processing of registering an address file according to the embodiment.

When it is judged at step 101 that processing of registering the address file is selected, the CPU 21 performs the processing of registering the address file shown in detail in FIG. 3 (step 200). When it is judged at step 101 that processing of modifying the address file is selected, the CPU 21 performs the processing of modifying the address file shown in detail in FIG. 6 (step 300). When it is judged at step 101 that processing of deleting the address file is selected, the CPU 21 performs the processing of deleting the address file shown in detail in FIG. 7 (step 400). When it is judged at step 100 that processing of copying the address file is selected, the CPU 21 performs the processing of copying the address file shown in detail in FIG. 9 (step 500). When it is judged at step 100 that processing of printing the address file is elected, the CPU 21 performs the processing of printing the address file shown in detail in FIG. 9 (step 600).

(B-1) Processing of Registering Address File

Referring to the flowchart shown in FIG. 3, concrete processing of registering the address file will be detailed hereinafter.

On entering the processing of registering the address file, the CPU 21 allows the user to select a management number used for regulating a storage area in which the address file will be registered (step 201). In the tape printing apparatus according to this embodiment, the RAM 23 provided in the mainframe of the apparatus is adapted to store 100 address files at its maximum, and the add-on RAM 23 is also adapted to store 100 address files at its maximum. Management numbers "00" to "99" are allocated to each of the RAM 23 in the mainframe and the add-on RAM 23. The management numbers "00" to "99" allocated to the add-on RAM 23 are displayed in the form of an encircled numeric character so as to be distinguished from those allocated to the RAM 23 in the mainframe.

The management number is selected in the following way. The CPU 21 accesses the address file management table 23*c* shown in FIG. 4 to find out the smallest management number out of the management numbers which are not used for registering an address file yet, and causes the display 35 to display the management number thus found as an initial eligible management number. Thereafter, if the next eligible management number is designated by operating, for example, a cursor movement key, the CPU 21 changes the displayed management number from the initial eligible one to the next eligible one. When the displayed management number is selected by operating the selection key, the selected management number is determined to the management number used for ruling the storage area in which the address file containing address data which will be inputted hereafter. Hereinafter, the management number used for ruling an address file will be often referred to as "address-file management number"

In addition to the above-mentioned way of selecting a management number, the management number may be selected by inputting numerals representing the management number.

In the course of selecting the management number, the CPU 21 also verifies whether or not the RAM 23 has an empty space for registering the address file.

Figures 4, 5:
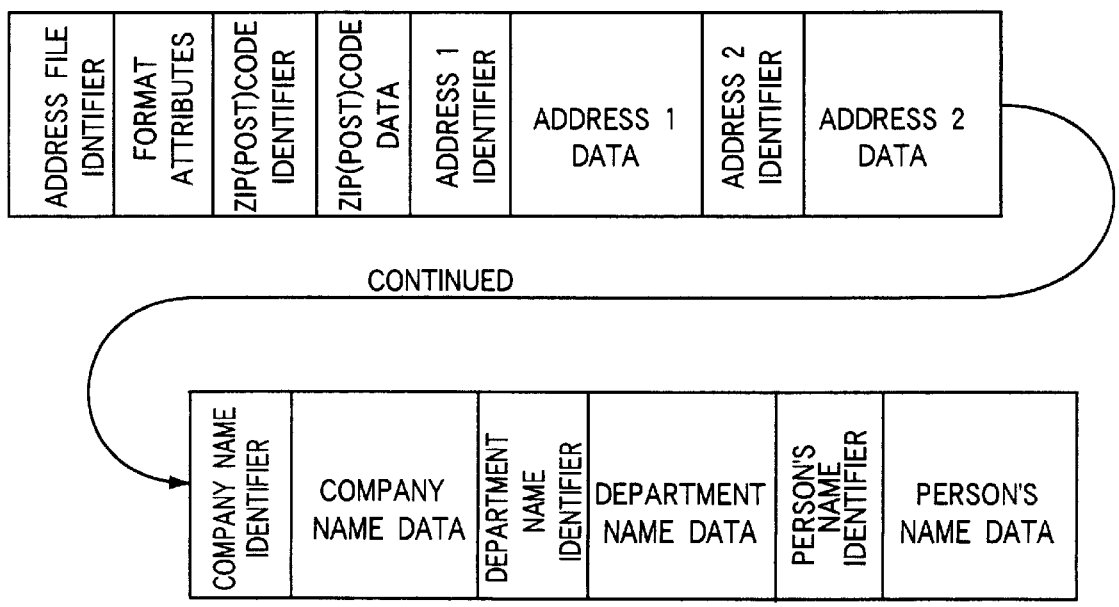
FIG. 4 is an explanatory view showing the configuration of an address file management table according to the embodiment.
FIG. 5 is an explanatory view showing the configuration of an address file according to the embodiment.

The address-file management table, which is appropriately accessed in the course of the above-mentioned various types of address file processings, contains a registration flag, a head address, a data length and a proximate flag, which are related to each address-file management number, as shown in FIG. 4.

The registration flag shows whether or not an address file is registered in connection with the management number. The head address shows an address in the RAM 23 in which the head data of the address file is stored. The data length represents a data length of the address file. The storage area of the RAM 23 in which the address file is stored is specified by the head address and the data length. The proximate flag specifies the address file which was registered or modified last time, i.e., at a time immediately before the current time.

After allowing the user to select the management number used for ruling the address file to be registered as described above, if an input character string inputted before designation of the address-file processing mode exists in the input buffer, the CPU 21 causes the input character string to be deleted from the input buffer (steps 201 and 202). The steps 201 and 202 of deleting the input character string are needed because the input buffer for storing the input character string used in the non-address character-string processing mode is also used in the address-file processing mode.

Thereafter, the CPU 21 allows input of a character string for a zip code, that for an address 1, that for an address 2, that for a company name, that for a department name and/or that for a person's name (steps 203, 206, 208, 210, 212 and 214). It should be noted that, with respect to each item, immediately after the step of inputting a character string for the item, the CPU 21 verifies whether or not the input item is altered (steps 204, 207, 209, 211, 213 and 215). When it is judged that the alteration of the input item is designated, the input item is shifted to the next one. Shifting of the input item to the next item is designated by operating, for example, a cursor downward movement key or a selection key (excluding the case where the input item is a person's name). By contrast, shifting of the input item to a previous item is designated, for example, by operating a cursor upward movement key. Alternatively, shifting of the input item to the previous item is designated, for example, by operating a cursor upward movement key, or by operating a deletion key when the cursor is located at an input guidance for the item. The "input guidance" is a symbol which represents that the character string currently being inputted is associated with the item displayed after the input guidance. As an example of the input guidance, a symbol "[" can be mentioned. When the CPU 21 enters each of the items for the first time, no input character string is displayed. On the other hand, when the CPU 21 enters the item for the second or subsequent time, the character string having been inputted is displayed.

Here, the number of characters of a character string must be not more than 20 for each item except for the zip code, and input of more than 20 characters is not accepted. As described above, an address is divided into two items, "address 1" and "address 2", in view of the fact that the address often contains a building name or the like and the character string of the address tends to become long.

In this embodiment, when the input item is shifted from the zip code to the address 1, the CPU 21 extracts an administrative district name (for example, a Todofuken name in Japan, a state name in U.S.A., a county name in England, and so on) and on the basis of the upper two digits of the zip code by accessing the zip code-administrative district name of the address 1 is already inputted (step 205), and then allows the user to input the character string for the address 1 other than the automatically inputted administrative district name (step 206).

In the input state for a person's name (irrespective of whether or not the character string of the person's name is actually inputted), when the selection key is operated, the CPU 21 causes the liquid crystal display 35 to display a message for inquiring the user whether or not he desires to execute registration of the address file. Thereafter, the CPU 21 judges which key is operated by the user and judges whether execution of the registration is selected or cancelled (step 216). When it is judged at step 216 that execution of the registration of the address file is cancelled, for example, by operating a cancel key, the input state for a person's name is restored.

By contrast, when it is judged at step 216 that execution of the registration is selected, the CPU 21 transfers the address data stored in the input buffer into an empty space in the storage area of the RAM 23 for storing address files, and correspondingly updates the address file management table 23c (step 217). Thereafter, the CPU 21 causes the liquid crystal display 35 to display an ordinary input screen (step 218), thus completing the sequence of the processings of registering the address file.

As described above, since the storage area of the RAM 23 for storing address files is managed by the address file management table 23c, the address files can be stored in the same storage area that stores external-character files and non-address character-string files. Owing to this configuration, the RAM 23 can be used efficiently.

FIG. 5 is an explanatory view illustrating the data structure of the address file to be stored. The address file contains an address file identifier (including the management number) which represents that the address file begins therefrom, format attributes to be applied to the address data and to rule the arrangement and so on of the character strings, and six items each containing its identifier and its character data.

In this embodiment, the format attributes are previously provided in the apparatus and cannot be altered by the user (the font may be changed according to the characters of the character strings). Accordingly, unlike FIG. 5, the address file may have a data structure in which the format attributes are not contained.

In the address file, there are provided identifier for each item so that each item can be easily identified regardless of whether or not character data for the item is inputted. Specifically, depending on the items, in some cases, input of character string is omitted. For example, with respect to department name or person's name, input of a character string tends to be omitted. With respect to such items whose input character string is omitted, character data are not inserted into the address file. As a result, there are various combinations of the items whose character data are inserted into the address file. Under the circumstances, the identifiers are needed for clearly distinguishing the items from one another.

In the registration processing, update of the address management table 23c is performed in the following way. First, the state of the registration flag the associated management number is turned into the on state. Then, the head address of the storage area of the RAM 23 in which the address file is stored, and the data length are stored in the table 23c. The state of the proximate flag associated with the management number is turned into the on state and the proximate flag having been in the on state is turned into the off state.

It should be noted the apparatus may be configured in such a manner that the registration of an address file is not executed unless at least the character string of the address 1 and that of the company name are inputted, or unless at least the character string of the address 1 and that of the person's name are inputted.

(B-2) Processing of Modifying Address File

Figure 6:
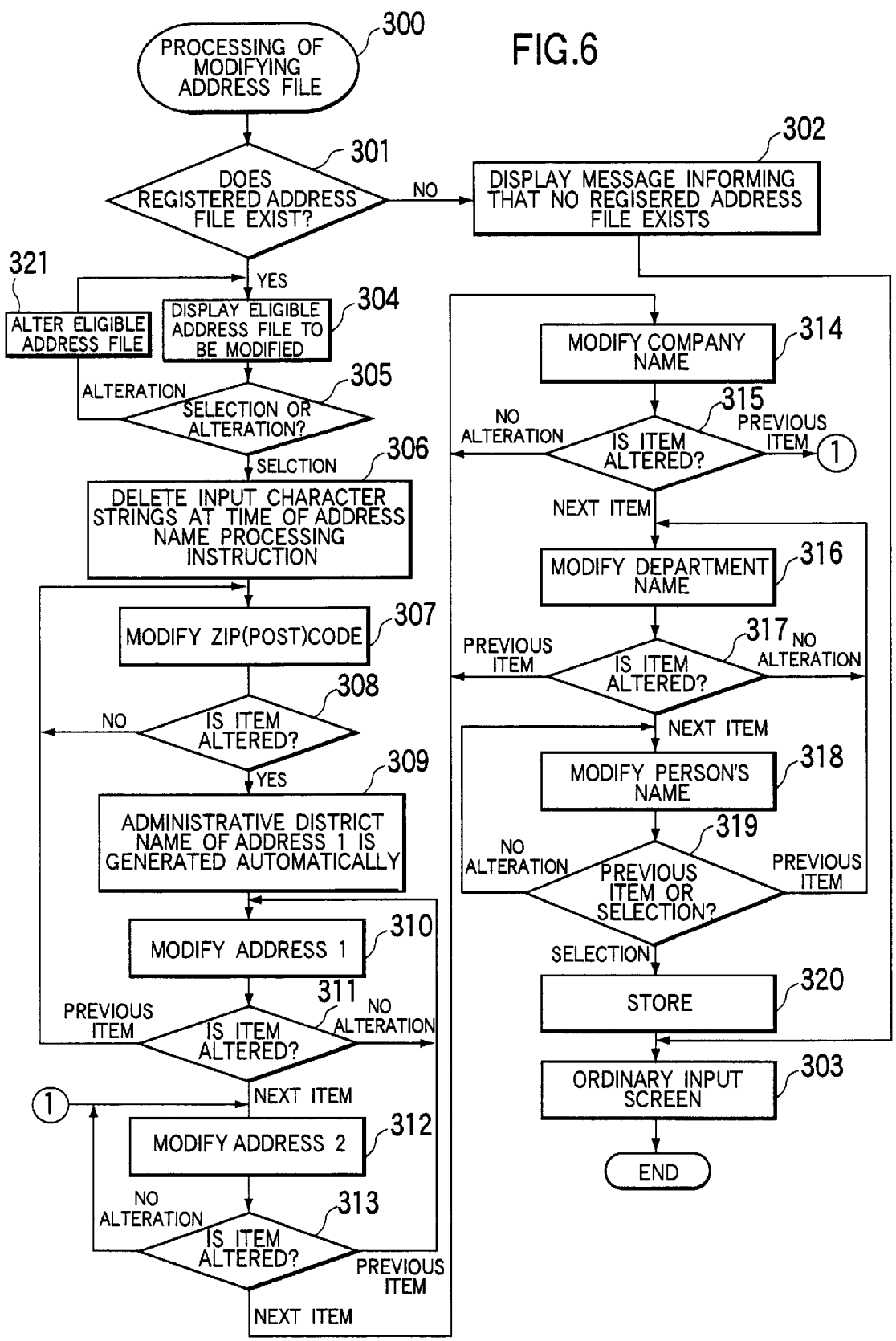
FIG. 6 is a flowchart showing processing of modifying the address file according to the embodiment.

Next, referring to the flowchart shown in FIG. 6, the concrete contents of the processing of modifying the address file will be described.

On entering the processing of modifying the address file, the CPU 21 first accesses the address file management table 23c to judge whether or not an address file having been already registered exists in the table 23c (step 301).

When it is judged at step 301 that there is no file having been already registered exists in the table 23c, the CPU 21 causes the liquid crystal display 35 to display a message informing the user that no registered file exists (step 302). Thereafter, the CPU 21 causes the liquid crystal display 35 to restore the ordinary input screen (step 303), thus completing the sequence of processings of modifying the address file. When the ordinary input screen is restored, since the input character string inputted before registration of the address-file processing mode is kept in the input buffer, the character string thus kept is displayed.

When it is judged at step 301 that an address file having been registered exists in the table 23c, the CPU 21 causes the liquid crystal display 35 to display one of the registered address files as an eligible address file to be modified (step 304). Thereafter, the CPU 21 judges whether the displayed address file is selected as an address file to be modified or alteration of the eligible address file is designated (step 305). When it is judged at step 305 that alteration of the eligible address file is designated, another registered address file is displayed as a new eligible address file (steps 321 and 304).

The eligible address file to be modified is displayed at step 304 in the following way. Specifically, if there is an address file whose proximate flag is in the on state in the table 23c, the CPU 21 causes the liquid crystal display 35 to display the address file as the eligible address. If there is not an address file whose proximate flag is in the on state in the table 23c, the CPU 21 causes the liquid crystal display 35 to display an address file whose registration flag is in the on state and whose management number is the smallest.

The alteration of the eligible file at steps 305 and 321 is performed in the following way. When the alteration of the eligible address file is designated by operating a cursor movement key, the address file whose registration flag is in the on state and whose management number is the second smallest is displayed. When the alteration of the eligible address file is designated through numeral input, the address file whose management number coincides with the input number represented by the input numerals is displayed. If there is not a management number whose registration flag is in the on state and which coincides with the input number, the smallest one of the management numbers whose registration flag are in the on state and which are larger than the input number is selected, and the management number thus selected is displayed as the eligible address file after alteration. If there is not a management number whose registration flag is in the on state and which is larger than the input number, the processing is returned to the smallest management number whose registration flag is in the on state, and the same processing is continued.

Here, display of the eligible address files is performed in the following way. Specifically, assuming that the liquid crystal display 35 can display up to four lines, an indication representing that the apparatus is in the address file modification mode and the management number are displayed at the first line, the former portion of the character string of the company name is displayed at the second line, the former portion of the character string of the person's name is displayed at the third line, the former portion of the character string of the address 1 (that is, the characters of up to the allowable number of the display 35) are displayed at the fourth line, data of the company name, the person's name and the address 1 being read out of the storage area of the RAM 23 in which the address file is stored. It should be noted that, if an item has no corresponding data, no character string is displayed for the item. As described above, an address file consists of the six items. This implies that, if the liquid crystal display can display up to four lines, all the data cannot be displayed. However, displaying the character strings as to the above-mentioned three items, i.e., the company name, the person's name and the address 1 is sufficient for the user to verify whether or not the displayed address file is a desired one.

When the displayed address file is selected as an address file to be modified, the CPU 21 reads, on the basis of the head address and the data length both associated with the address file which are stored in the address file management table 23c, data of the address file out of the storage area of the RAM 23 in which the address file is stored, and transfer the data thus read-out into the input buffer (step 306). As a result, the input character string inputted before designation of the address-file processing mode is erased.

Thereafter, as in the case of the processing of registering an address file, the character string of the zip code, that of the address 1, that of the address 2, that of the company name, that of the department name and/or that of the person's name are modified (steps 307 to 319).

In the state in which the person's name is modified (irrespective of whether or not the character string is actually inputted), when the selection key is operated, the CPU 21 transfers the address data obtained after the modification which is stored in the input buffer into the storage area of the RAM 23 in which the address file before the modification associated with the management number was once stored. Correspondingly, the CPU 21 also updates the contents of the address file management table 23c (step 320). Thereafter, the CPU 21 causes the liquid crystal display 35 to display an ordinary input screen (step 303), thus completing the sequence of the processings of modifying the address file.

In the processing of modifying the address file, updating the contents of the file address management table 23c at step 320 is performed in the following way. First, the registration flag of the associated management number is maintained as it is. The head address of the storage area in the RAM 23 in which the address file obtained after modification is stored is maintained as it is, and the data length obtained after modification is stored. The state of the associated proximate flag is turned into the on state (including the case where the on state is maintained), all the other proximate flag is turned into the off state.

When the CPU 21 proceeds from step 320 to step 303 to display the ordinary input screen, the input screen contains no character string because the input character string inputted before designation of the address-file processing mode is already erased.

(B-3) Processing of Deleting Address File

Figure 7:
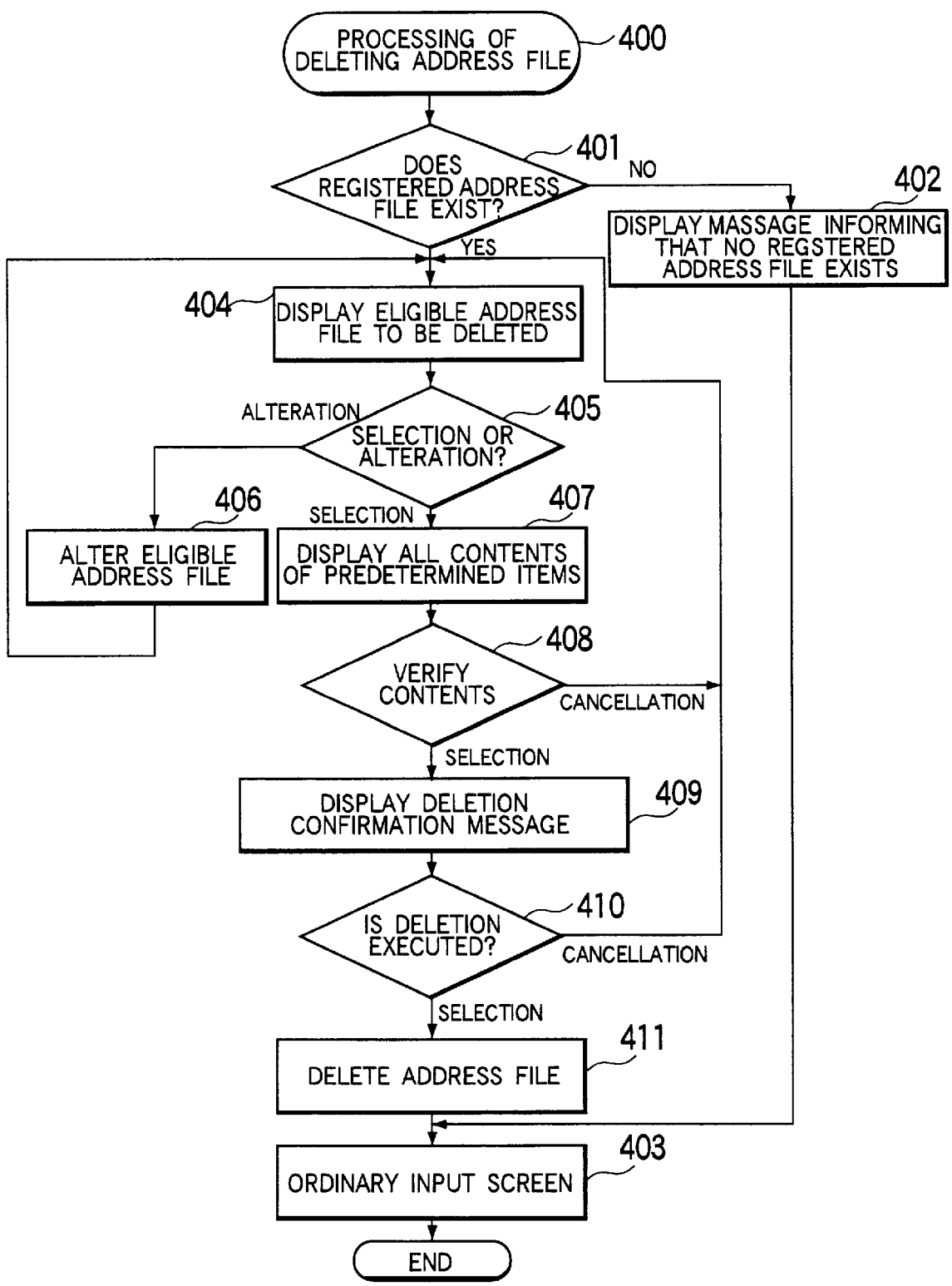
FIG. 7 is a flowchart showing processing of deleting the address file according to the embodiment.

Referring to the flowchart shown in FIG. 7, concrete processing of deleting the address file will be described hereinafter.

On entering the processing of deleting the address file, the CPU 21 first accesses the address file management table 23c to judge whether or not an address file having been already registered exists in the table 23c (step 401).

When it is judged at step 401 that no file having been already registered exists in the table 23c, the CPU 21 causes the liquid crystal display 35 to display a message informing the user that no registered file exists (step 402). Thereafter, the CPU 21 causes the liquid crystal display 35 to restore the ordinary input screen (step 403), thus completing the sequence of processings of deleting the address file. When the ordinary input screen is restored, since the input character string inputted before designation of the address-file processing mode is kept in the input buffer, the character string thus kept is displayed.

When it is judged at step 401 that an address file having been registered exists in the table 23c, the CPU 21 causes the liquid crystal display 35 to display one of the registered address files as an eligible address file to be deleted (step 404). Thereafter, the CPU 21 judges whether the displayed address file is selected as an address file to be deleted or alteration of the eligible address file is designated (step 405). When it is judged at step 405 that alteration of the eligible address file is designated, another registered address file is displayed as a new eligible address file (steps 406 and 404).

The eligible address file to be deleted is displayed at step 404 in the following way. Specifically, irrespective of whether the proximate flag is in the on or off state, the CPU 21 causes the liquid crystal display 35 to display an address file whose registration flag is in the on state and whose management number is the smallest.

The alteration of the eligible file at steps 305 and 321 is performed in the following way. When the alteration of the eligible address file is designated by operating a cursor movement key, the address file whose registration flag is in the on state and whose management number is the second smallest is displayed. When the alteration of the eligible address file is designated through numeral input, the address file whose management number coincides with the input number represented by the input numerals is displayed. If there is not a management number whose registration flag is in the on state and which coincides with the input number, the smallest one of the management numbers whose registration flag are in the on state and which are larger than the input number is selected, and the management number thus selected is displayed as an eligible address file after alteration. If there is not a management number whose registration flag is in the on state and which is larger than the input number, the processing is returned to the smallest management number whose registration flag is in the on state and the same processing is continued.

Here, in the deletion processing as well, display of the eligible address files is performed in the following way. Specifically, assuming that the liquid crystal display 35 can display up to four lines, an indication representing that the apparatus is in the address file deletion mode and the management number are displayed at the first line, the former portion of the character string of the company name is displayed at the second line, the former portion of the character string of the person's name is displayed at the third line, and the former portion of the character string of the address 1 is displayed at the fourth line, data of the company name, the person's name and the address 1 being read out of the storage area of the RAM 23 in which the address file is stored. It should be noted that if an item has no corresponding data, no character string is displayed for the item.

When the displayed eligible address file is selected as an address file to be deleted, the CPU 21 brings about the state in which the contents of the eligible address file are verified, that is the state in which the management number is displayed in a flashing manner and the former portion of the character string of the company name, the former portion of the person's name and that of the former part of the address 1 is displayed in an inverse manner, and horizontal scrolling is performed in accordance with operations of a cursor movement key performed by the user (step 407). By causing the apparatus to execute the horizontal scrolling of the displayed address file, the user can verify all of the character string of the company name, that of the person's name and that of the address 1. In the state in which the contents of the eligible address file are verified, the CPU 21 judges whether the displayed eligible address file is selected or cancelled (step 408).

When it is judged at step 408 that the eligible address file is cancelled (for example, by operating the cancel key or the like), the CPU 21 returns to step 404 in which an eligible address file to be deleted is displayed.

By contrast, when the eligible address file is selected as an address file to be deleted, the CPU 21 displays a message of inquiring the user whether he desires to execute or to cancel deletion of the eligible address file (step 409), and judges whether the user has selected execution of the deletion or cancellation of the deletion (step 410).

When it is judged at step 410 that cancellation of the deletion of the address file is designated by operating the cancel key or the like, the CPU 21 returns to step 404 in which an eligible address file to be deleted is displayed.

When it is judged at step 410 that execution of the deletion is designated, the CPU 21 deletes the address file associated with the selected management number (step 411). Thereafter, the CPU 21 causes the liquid crystal display 35 to display an ordinary input screen (step 403), thus completing the sequence of the processings of deleting the address file. When the ordinary input screen is restored at step 403, the input character string inputted before designation of the address-file processing mode is kept in the input buffer, and therefore the character string thus kept is displayed.

The processings of deleting the address file may be performed either by taking an action on only the address file management table 22c or by taking actions both on the address file management table 23c and on the storage area of the RAM 23 in which the address file associated with the management number is stored. In the former case, the states of the registration and proximate flags are turned into the off state, and the states of the head address and the data length are turned into all 0 or all 1. In the latter case, in addition to these actions applied on the address file management table 23c, the CPU 21 also executes an action of erasing the storage area of the RAM 23 in which the address file associated with the management number by turning the state of the storage area into all 0 or all 1.

(B-4) Processing of Copying Address File

Figure 8:
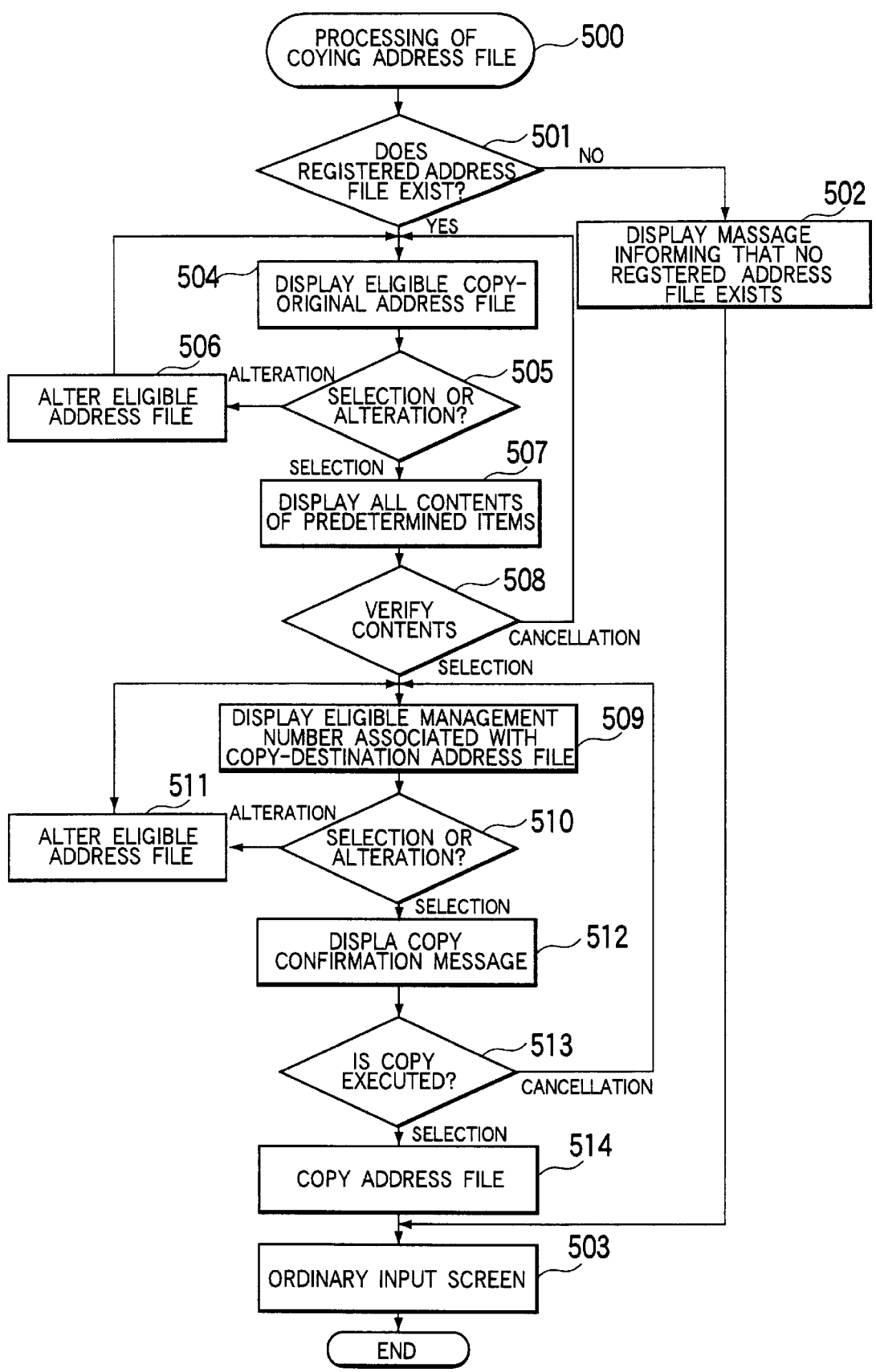
FIG. 8 is a flowchart showing processing of copying the address file according to the embodiment.

Next, referring to the flowchart shown in FIG. 8, concrete processing of modifying the address file will be described.

On entering the processing of copying the address file, the CPU 21 first accesses the address file management table 23c to judge whether or not an address file having been already registered exists in the table 23c (step 501).

When it is judged at step 501 that no file having been already registered exists in the table 23c, the CPU 21 causes the liquid crystal display 35 to display a message informing the user that no registered file exists (step 302). Thereafter, the CPU 21 causes the liquid crystal display 35 to restore the ordinary input screen (step 303), thus completing the sequence of processings of modifying the address file. When the ordinary input screen is restored, since the input character string inputted before designation of the address-file processing mode is kept in the input buffer, the character string thus kept is displayed.

When it is judged at step 501 that an address file having been registered exists in the table 23c, the CPU 21 causes the liquid crystal display 35 to display one of the registered address files (that is, address files whose registration flag is in the on state as an eligible copy-original address file to be copied (step 504). Thereafter, the CPU 21 judges whether the displayed address file is selected as an address file to be copied or alteration of the eligible copy-original address file is designated (step 505). When it is judged at step 505 that alteration of the copy-original address file is designated, another registered address file is displayed as a new eligible copy-original address file (steps 506 and 504).

The eligible copy-original address file to be copied is displayed at step 504 in the following way. Specifically, if there is an address file whose proximate flag is in the on state in the table 23c, the address file is selected and displayed as the eligible copy-original address file. If there is not an address file whose proximate flag is in the on state in the table 23c, the CPU 21 causes the liquid crystal display 35 to display a copy-destination address file whose registration flag is in the on state and whose management number is the smallest.

The alteration of the eligible copy-original address file at steps 506 and 504 is performed in the following way. When the alteration of the eligible copy-original address file is designated by operating a cursor movement key, the address file whose registration flag is in the on state and whose management number is the second smallest is displayed. When the alteration of the eligible copy-original address file is designated through numeral input, the address file whose management number coincides with the input number represented by the input numerals is displayed. If there is not a management number whose registration flag is in the on state and which coincides with the input number, the smallest one of the management numbers whose registration flag are in the on state and which are larger than the input number is selected, and the management number thus selected is displayed as an eligible copy-original address file after alteration. If there is not a management number whose registration flag is in the on state and which is larger than the input number, the processing is returned to the smallest management number whose registration flag is in the on state, and the same processing is continued.

Here, in the copy processing as well, display of the eligible copy-original address files is performed in the following way. Specifically, assuming that the liquid crystal display 35 can display up to four lines, an indication representing that the copy-original address file and the management number are displayed at the first line, the former portion of the character string of the company name is displayed at the second line, the former portion of the character string of the person's name is displayed at the third line, and the former portion of the character string of the address 1 is displayed at the fourth line, the data of the company name, the person's name and the address 1 being read out of the storage area of the RAM 23 in which the address file is stored. It should be noted that if an item has no corresponding data, no character string is displayed for the item.

When the displayed eligible copy-original address file is selected as an address file to be copied, the CPU 21 brings about the state in which the contents of the eligible copy-original address file are verified, that is, the state in which the copy-original management number is displayed in a flashing manner and the former portion of the character string of the company name, the former portion of the character string and the former portion of the character string of the address 1 is displayed in an inverse manner, and horizontal scrolling is performed in accordance with operations of a cursor movement key performed by the user (step 507). By causing the apparatus to execute the horizontal scrolling of the displayed address file, the user can verify all of the character string of the company name, that of the person's name and that of the address 1. In the state in which the contents of the eligible address file are verified, the CPU 21 judges whether the displayed eligible address file is selected or cancelled (step 508).

When it is judged at step 508 that the eligible copy-original address file is cancelled (for example, by operating the cancel key or the like), the CPU 21 returns to step 504 in which an eligible copy-original address file to be copied is displayed.

By contrast, when the eligible copy-original address file is selected as an address file to be copied, the CPU 21 causes the liquid crystal display 35 to display an eligible copy-destination management number (a management number whose registration flag is in the off state) (step 509), and judges whether the displayed eligible copy-destination management number is selected or alteration of the eligible copy-destination management number is designated (step 510).

When alteration of the eligible copy-destination management number is designated, another management number is selected out of the management numbers which are not used for registering an address file, and the displayed eligible copy-destination management number is altered into the management number thus selected as a new eligible copy-destination management number (steps 511 and 509). It should be noted that, while not shown in FIG. 8, there is a processing step in which, if the table 23c already contains so many address files that it cannot accept another copied address file, the CPU 21 causes the liquid crystal display 35 to display a message informing that the memory is full and then restores an ordinary input screen (step 503), thus completing the sequence of processings of copying the address file.

The eligible copy-destination address file is displayed at step 509 in the following way. Specifically, the CPU 21 causes the liquid crystal display 35 to display an address file whose registration flag is in the on state and whose management number is the smallest.

The alteration of the eligible copy-destination address file at steps 510 and 511 is performed in the following way. When the alteration of the eligible copy-destination address file is designated by operating a cursor movement key, the address file whose registration flag is in the on state and whose management number is the second smallest is displayed. When the alteration of the eligible copy-destination address file is designated through numeral input, the address file whose management number coincides with the input number represented by the input numerals is displayed. If there is not a management number whose registration flag is in the on state and which coincides with the input number, the smallest one of the management numbers whose registration flag are in the on state and which are larger than the input number is selected, and the management number thus selected is displayed as an eligible address file after alteration. If there is not a management number whose registration flag is in the on state and which is larger than the input number, the processing is returned to the smallest management number whose registration flag is in the on state, and the same processing is continued.

By contrast, when the eligible copy-destination address file is selected as an address file to be copied, the CPU 21 displays a message of inquiring the user whether he desires to execute or to cancel copying of the address file (step 512), and judges whether the user has selected execution of the copying or cancellation of the copying (step 513).

When it is judged at step 513 that cancellation of the copying of the address file is designated by operating the cancel key or the like, the CPU 21 returns to step 509 in which an eligible copy-destination address file is displayed.

When it is judged at step 513 execution of the copying is designated, the CPU 21 copies the address file associated with the selected copy-original management number onto the storage area related to the selected copy-destination management number to obtain the copy destination address file (step 514). Thereafter, the CPU 21 causes the liquid crystal display 35 to display an ordinary input screen (step 503), thus completing the sequence of the processings of deleting the address file. When the ordinary input screen is restored at step 503, the input character string inputted before designation of the address-file processing mode is kept in the input buffer, and therefore the character string thus kept is displayed.

In the copy processing, updating of the address file management table 23c (executed in step 514) is performed in the following manner. The state of the registration flag associated with the management number under which the copy-destination address file is stored is turned into the on state. The table 23c stores the head address of the storage area of the RAM 23 in which the copy-destination address file is stored, and the data length of the copy-destination address file. The proximate flag associated with the management number of the copy-destination address file is turned into the on state. This operation is performed in view of the fact that the copy-destination address file is often modified. With respect to the copy-original address file, if the proximate flag is in the on state, only the operation of turning the state of the proximate flag into the off state is performed, and updating the other data is not performed.

(B-5) Processing of Printing Address File

Figure 9:
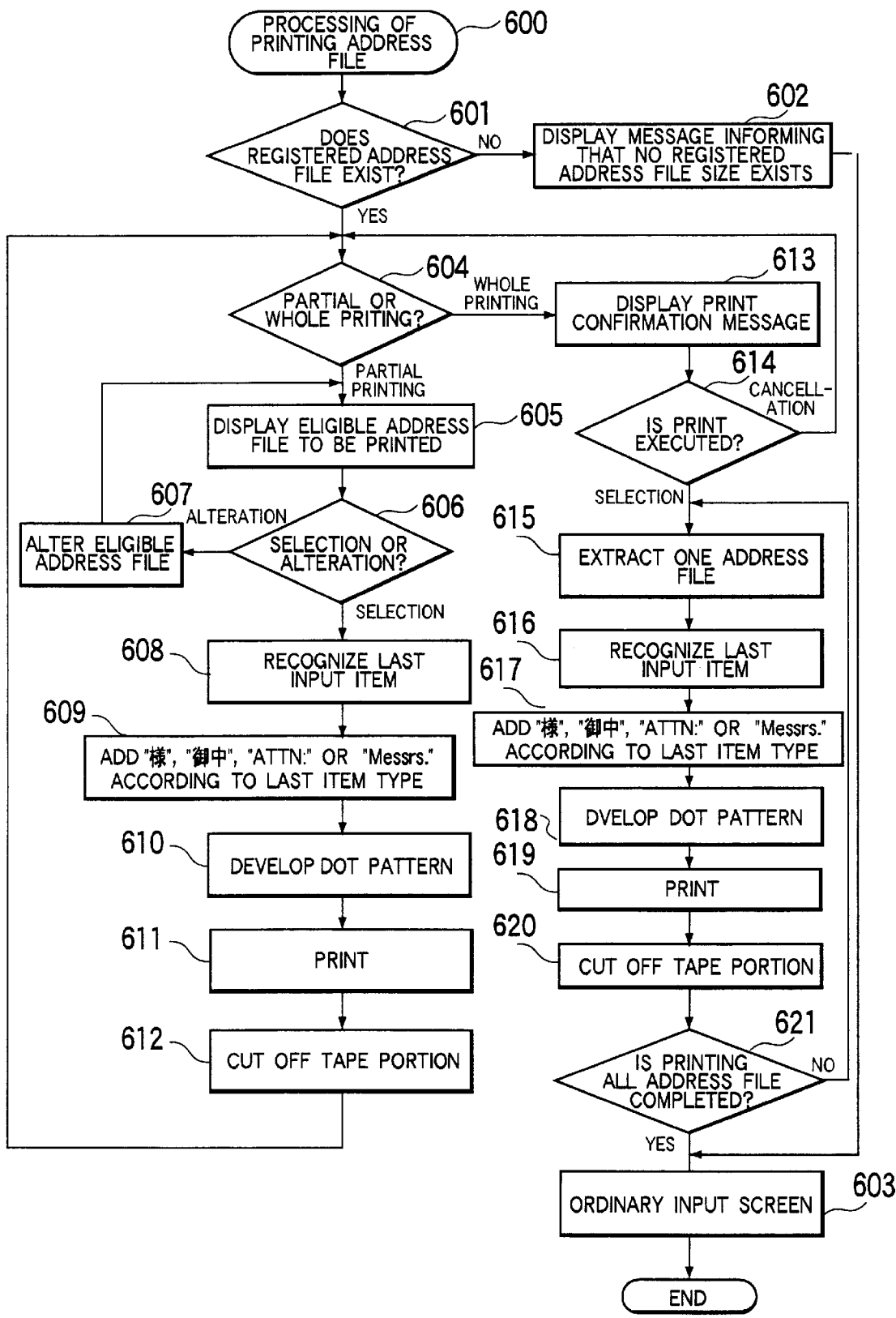
FIG. 9 is a flowchart showing processing of printing the address file according to the embodiment.

Next, referring to the flowchart shown in FIG. 9, the concrete processing of modifying the address file will be described.

On entering the processing of printing the address file, the CPU 21 first accesses the address file management table 23c to judge whether or not an address file having been already registered exists in the table 23c (step 601).

When it is judged at step 601 that there is no file having been already registered exists in the table 23c, the CPU 21 causes the liquid crystal display 35 to display a message informing the user that no registered file exists (step 602). Thereafter, the CPU 21 causes the liquid crystal display 35 to restore the ordinary input screen (step 603), thus completing the sequence of processings of printing the address file. When the ordinary input screen is restored, since the input character string inputted before designation of the address-file processing mode is kept in the input buffer, the character string thus kept is displayed.

When it is judged at step 601 that an address file having been registered exists in the table 23c, the CPU21 causes the liquid crystal display 35 to display a message inquiring the user whether he desires to print one address file or all the address files (hereinafter, to print one address file will be often referred to as "partial printing" and to print all the address files will be often referred to as "whole printing"), and thereafter judges whether he has designated partial printing or whole printing (step 604).

When printing a part of the address files is designated, the CPU 21 causes the liquid crystal display 35 to display an eligible address file to be printed (address file whose registration flag is in the on state) (step 605), and thereafter judges whether the displayed eligible address file is selected or alteration of the eligible address file is designated (step 606). When alteration of the eligible file is designated, the displayed eligible address file is altered to another registered address file, and the registered file thus altered is displayed as a new eligible address file to be printed (steps 607 and 605).

The eligible address file to be printed displayed at step 605 in the following way. Specifically, if there is an address file whose proximate flag is in the on state in the table 23c, the address file is selected and displayed as the eligible address file. If there is not an address file whose proximate flag is in the on state in the table 23c, the CPU 21 causes the liquid crystal display 35 to display an address file whose registration flag is in the on state and whose management number is the smallest.

The alteration of the eligible file at steps 606 and 607 is performed in the following way. When the alteration of the eligible address file is designated by operating a cursor movement key, the address file whose registration flag is in the on state and whose management number is the second smallest is displayed. When the alteration of the eligible address file is designated through numeral input, the address file whose management number coincides with the input number represented by the input numerals is displayed. If there is not a management number whose registration flag is in the on state and which coincides with the input number, the smallest one of the management numbers whose registration flag are in the on state and which are larger than the input number is selected, and the management number thus selected is displayed. If there is not a management number whose registration flag is in the on state and which is larger than the input number, the processing is returned to the smallest management number whose registration flag is in the on state and the same processing is continued.

Here, in the partial print processing as well, display of the eligible address files is performed in the following way. Specifically, assuming that the liquid crystal display 35 can display up to four lines, an indication representing that the address file is an object to be printed and the management number are displayed at the first line, the former portion of the character string of the company name is displayed at the second line, the character string of the person's name is displayed at the third line, and the former portion of the character string of the address 1 is displayed at the fourth line, the former portion of the data of the company name, the person's name and the address 1 being read out of the storage area of the RAM 23 in which the address file is stored. It should be noted that if an item has no corresponding data, no character string is displayed for the item.

When the address file displayed is selected as an address file to be printed, the CPU 21 judges whether the width of the loaded tape is allowed for printing an address file (when it is judged that the width of the loaded tape is not allowed for printing an address file, the CPU 21 urges the user to change the tape).

Thereafter, in the case of an address (destination) written in the Japanese style, the CPU 21 reads out the address file thus selected and recognizes the last one of the items whose character string exists (step 608). When the last item thus recognized is a company name or a department name, the CPU 21 automatically add characters "御中" (an honorific title added to the tail of the name of a company, or to the tail of the name of a department in a company, which is used in the Japanese language system) to the tail of the company name or department name. When the last item thus recognized is a person's name, the CPU 21 automatically add a character "様" (an honorific title added to the tail of a person's name, used in the Japanese language system) to the tail of the person's name (step 609).

In the case of an address (destination) written in the English style, the CPU 21 reads out the address file thus selected and recognizes the last one of the items whose character string exists (step 608). When the last item thus recognized is a company name or a department name, the CPU 21 automatically add, for example, characters "Messrs." (an honorific title added to the top of the name of a company, or to the top of the name of a department in a company, which is used in the English language system) to the top of the company name or department name. When the last item thus recognized is a person's name, the CPU 21 automatically add, for example, characters "ATTN:" (characters added to the top of a person's name, used in the English language system) to the top of the person's name (step 609).

Thereafter, the CPU 21 develops the dot pattern of the address data in the print buffer 23a in accordance with the print attributes which are automatically determined with respect to the address file (it should be noted that the character size is determined in accordance with the tape width) (step 610). Thereafter, the CPU activates the thermal head 32 and the tape/ribbon feeding motor 31 to perform printing (step 611). Finally, the CPU 21 activates the tape cutting mechanism 37 to cut off the tape portion on which the character strings are printed (step 612). Thereafter, the CPU 21 returns to step 604 in which partial printing or whole printing is selected. Owing to this configuration, the CPU 21 can shift to printing of another address file. According to the flowchart in FIG. 9, it seems that, when partial printing is performed, print processing cannot be terminated. However, at step 604 in which partial printing or whole printing is selected, when a cancel key is operated, the print processing is terminated.

FIGS. 10A and 10B show examples of labels on which printed results of the address file in the Japanese style, in which character strings of a company name and a department name are omitted. In such a case, as shown in FIG. 10A, the character strings of the rest four items (i.e., four lines) may be printed in such a manner as to be disposed in the same pitch in the width direction of the tape. Alternatively, as shown in FIG. 10B, the print positions for the respective items in the width direction are previously determined, and the character string is not printed (that is, the line for the item becomes blank) as to an item whose character string does not exist.

FIGS. 11A and 11B show examples of labels on which printed results of the address file in the English style, in which character strings of a company name and a department name are omitted. In such a case, as shown in FIG. 11A, the character strings of the rest four items (which are arranged in three lines) may be printed in such a manner as to be disposed in the same pitch in the width direction of the tape. Alternatively, as shown in FIG. 11B, the print positions for the respective items in the width direction are previously determined, and the character string is not printed (that is, the line for the item becomes blank) as to an item whose character string does not exist.

As a result of the judgment at step 604 as to whether the user has designated partial printing or whole printing, it is judged that the whole printing is designated, the CPU 21 causes the liquid crystal display 35 to display a whole printing confirmation message which confirms that the user has selected printing all the address files (step 613). Thereafter, the CPU 21 judges whether, in response to the message, the user has selected execution of the whole printing or cancellation of the whole printing (step 614). When cancellation of the whole printing is selected, the processing is returned to step 604.

When the whole printing is selected, the CPU 21 extracts data of one address file on the basis of the contents stored in the address file management table (step 615). Thereafter, as to the data of the address file, the same print processings as in the partial printing are performed (steps 616 to 620).

When print processing is completed with respect to the current address file so that preparation of a label is completed, the CPU 21 judges whether or not print processings are completed with respect to all the address files (step 621). When it is judged that the print processings with respect to all the address files are not completed, the CPU 21 returns to the step 615 in which address files on which printing is not completed is extracted. On the other hand, when printings on all the address file are completed, the CPU 21 causes the liquid crystal display 35 to display an ordinary input screen (step 603), thus completing the sequence of the processings of printing the address file. When the ordinary input screen is restored at step 603, the input character string inputted before designation of the address-file processing mode is kept in the input buffer, and therefore the character string thus kept is displayed.

(C) Advantages of the Embodiment

According to the above-described embodiment, since the address file is managed by the address file management table, the tape printing apparatus of the above-described embodiment exhibits the following advantages (1) and (2).
(1) Since the address files and the non-address character-string files can be stored in the same storage area of the memory, the utilization ratio of the memory can be enhanced. [0092](2) Even though both the address files and the non-address character-string files are stored in the same storage area of the memory, since the both files are managed separately, the address file can be extracted easily.

Further, according to the above-described embodiment, since the form input method is employed in the course of processings of inputting and modifying the address data constituting the address file, the processings of inputting and modifying the address data can be performed easily. Since the administrative district name is automatically generated on the basis of the zip code, the processings of inputting and modifying the address data can be easily performed also in this respect. Further, there is provided a function of automatically generating "様", "御中", "ATTN:" or "Messrs.", the user need not input "様", "御中", "ATTN:" or "Messrs.", the processings of inputting and modifying the address data can be easily performed also in this respect.

Further, according to the above-described embodiment, as an advantage related to the above-mentioned advantages, since there is provided a whole printing function in addition to a partial printing function, the apparatus can be used in the situation where the user intends to print numerous addresses to send the same letter to numerous different destinations, so that the usability of the apparatus is greatly enhanced.

(D) Other Embodiments

Although the preferred embodiments of the present invention have been described above, it should be understood that the present invention is not limited thereto and that other embodiments and modifications, in addition to the above-mentioned other embodiments which are mentioned appropriately when described the main embodiments, will be apparent to those skilled in the art without departing form the spirit of the invention.

In the above-described embodiment, the processings of inputting and modifying the address data are performed in accordance with the form input method, but the present invention is not limited thereto. A character string may be inputted or modified in accordance with an ordinary input method and the input character string may be registered as an address file.

In the above-described embodiment, the characters "様", "御中", "ATTN:" or "Messrs." are automatically added in the processing of printing the address file, but the present invention is not limited thereto. The characters "様", "御中", "ATTN:" or "Messrs." may be automatically added when the address data is stored in the RAM 23 in the registration or modification processing. Alternatively, the characters "様", "御中", "ATTN:" or "Messrs." may be automatically added after the user confirms that the characters "様", "御中", "ATTN:" or "Messrs." do not exist at the tail of the character string.

Further, in the above-mentioned embodiment, there is no hierarchical structure among the address files. However, the address files may have a hierarchical structure. For example, the address files may be hierarchically grouped into two groups, that is, a first group address files (group of company-related address group) and a second group address file (for example, person-related address group).

Further, in the above-mentioned embodiment, as the type of the processing of printing the address file, there are two ways: partial printing and whole printing, but the present invention is not limited thereto. For example, there may be provided a type in which all the address files one of the above-mentioned groups are printed or a type in which two management numbers are inputted and all the address files whose management numbers are interposed between the two management numbers thus inputted are printed.

Further, in the above-mentioned embodiment, the CPU 21 proceeds to the print processing when the address-file processing mode is designated and then the print processing is designated, but the present invention is not limited thereto. For example, print processing is performed when an ordinary print key is operated while the address data is being displayed during registration or modification processing.

Further, the present invention exhibits excellent performance when it is applied to the tape printing apparatus, the apparatus to which the present invention is applied is not limited to the tape printing apparatus. The present invention can be generally applied to character information processors in which limitation is imposed on a widthwise dimension of a print medium and input character string to be printed can contain only several lines. For example, the present invention can be applied to a stamp producing apparatus adapted to produce a stamp having an uneven stamp face corresponding the input character string having one or more lines. It should be noted that, in the case of the stamp producing apparatus, it is not necessary to provide a function of printing (transferring) a plurality of address files.

It should be noted that, the function of automatically adding "樣", "御中", "ATTN:" or "Messrs." is not limited to the character information processor in which limitation is imposed on a widthwise dimension of a print medium and input character string to be printed can contain only several lines. Instead, the function can be generally applied to character information processors employing the form input method as the method of inputting and modifying the character strings of the address.

(D) Advantages of the Invention

As described above, according to the present invention, in a character information processor in which limitation is imposed on an allowable number of a character string to be printed, there are provided: storage means for storing an address file and a non-address character-string file in the same storage area thereof; an address file management table containing a management number, a registration flag representing whether or not an address file is registered in connection with the management number, address information representing a storage area of the storage means in which the address file associated with the management number is stored, and a proximate flag representing whether or not the address file associated with the management number is edited at the time immediately before the current time; and address file edit managing means for managing and editing the address file and the non-address character-string file which are stored in the same storage area of the storage means while distinguishing them from each other using the address file management table. Owing to this configuration, the utilization ratio is enhanced by storing the address files and the non-address character-string files in the same storage area in the memory, and at the same time, these two types of files can be managed separately. Accordingly, the address file can be extracted easily, and the usability of the apparatus is greatly enhanced in the respect of the address processings.

It should be noted that, since the present invention is not limited to the above-described embodiments and modifications, the present invention is to be determined solely by the appended claims.

What is claimed is:

1. A character information processor in which a limitation is imposed on an allowable number of characters in a character string to be printed, said character information processor comprising:

storage means for storing an address file and a non-address character-string file in the same storage area thereof;

an address file management table containing a management number, a registration flag representing whether or not an address file is registered in connection with the management number, address information representing a storage area of said storage means in which the address file associated with the management number is stored, and a proximate flag representing whether or the address file associated with the management number is edited at the time immediately before the current time; and address file edit managing means for managing and editing the address file and the non-address character-string file which are stored in the same storage area of said storage means while distinguishing them from each other using said address file management table.

2. The character information processor according to claim 1, wherein said address file edit managing means includes a registration part for registering the address file, a modification part for modifying the address file, a deletion part for deleting the address file, and copy part for copying the address file.

3. The character information processor according to claim 2, further comprising:

address file print instructing means for issuing an instruction of printing an address file stored in said storage means; and address-file printing means for printing, in accordance with a print attribute commonly applied to all the address files, the address file to be printed in accordance with the instruction.

4. The character information processor according to claim 3, wherein said address-file print instructing means issues either an instruction of printing all the registered address files or an instruction of printing a part of the registered files.

5. The character information processor according to claim 2, wherein the registration part and the modification part operate in accordance with a form input method in which a character string is inputted with respect to each item constituting the address file.

6. The character information processor according to claim 5, further comprising honorific title automatic adding means for automatically adding, in the case where an address file is newly inputted or modified in accordance with the form input method and where an item of the address file having a corresponding character string and placed at the end of the address file is one of the company name, the department name and the person's name, a character representing an honorific title suitable for the character string of the item which is placed at the end of the address file.

7. The character information processor according to claim 6, further comprising zip code-administrative district name conversion means for automatically generating, when the input item is shifted from a zip code to an address, characters representing an administrative district serving as a part of the address in accordance with an input zip code.

8. The character information processor according to claim 3, wherein the registration part and the modification part operate in accordance with a form input method in which a character string is inputted with respect to each item constituting the address file.

9. The character information processor according to claim 4, wherein the registration part and the modification part operate in accordance with a form input method in which a character string is inputted with respect to each item constituting the address file.

* * * * *